July 21, 1964    E. T. HOLLAND, JR    3,141,545
CONVEYOR STRUCTURE
Filed March 21, 1960

INVENTOR.
EDWARD T. HOLLAND Jr.
BY
ATTORNEYS

United States Patent Office 3,141,545
Patented July 21, 1964

3,141,545
CONVEYOR STRUCTURE
Edward T. Holland, Jr., Cedar Rapids, Iowa, assignor to Cherry-Burrell Corporation, Cedar Rapids, Iowa, a corporation of Delaware
Filed Mar. 21, 1960, Ser. No. 16,610
2 Claims. (Cl. 198—213)

This invention relates to a conveyor rail housing and a method of making the same, and more particularly to a wear-resistant, low-friction insert for a conveyor rail housing in which a drive shaft rotates.

In my U.S. Patent No. 2,911,802, entitled "Conveyor for Cooling Room," and in my co-pending applications, Serial No. 518,807, filed June 29, 1955, now abandoned, and Serial No. 666,023, filed June 17, 1957, now Patent No. 3,002,635, I have disclosed a conveyor of the overhead type which consists primarily of a recessed conveyor rail housing in which rotates a laterally-flexible, but torsionally rigid, spiral drive shaft. In this conveyor as disclosed in my prior inventions, the article or load is carried usually by a hook that rides on the top surfaces of the rail and engages the rotating spiral-drive shaft which moves the load along a linear path. There are similar conveyors in which the load carrying hook is supported by the drive shaft itself. In either type of conveyor there exists, of course, friction between the rotating drive shaft and the recessed rail housing in which it rotates. I have therefore found it necessary to provide some means for reducing the friction between these relatively moving parts, and one such means is to provide a method of lubrication, for example, as shown in my co-pending application Serial No. 518,807, referred to above. However, I have found this method of lubrication and other methods in which a liquid, semi-liquid or powdered lubricant is used to have certain disadvantages. Since these conveyors are often used for handling comestible products during processing, one of these disadvantages is the messiness associated with such lubrication.

Therefore, in accordance with my invention, I propose to eliminate lubrication by using an insert in the rail housing constructed of a wear-resistant, low-friction material. This insert or liner has the advantages that it is cleaner, quieter in operation, and provides a more positive and uniform method of reducing the friction. The insert is removable and therefore may be replaced when worn, and since it receives substantially all the wear, it should never be necessary to replace either the drive shaft or the rail housing for reasons of wear. Also, the liner is long-wearing and over a period of time should prove to be less troublesome and less expensive than lubrication. In other words, once the liner is in place in the rail housing, the conveyor should be substantially free from service and maintenance unless replacement of the liner becomes necessary.

A further advantage of this conveyor structure is the simple and inexpensive method I have devised for placing and retaining the liner in the rail housing. Since I have found extrusion to be the best and least expensive method of manufacturing the rail housing, my novel methods of assembling and retaining the liner in the housing are compatible with this type of manufacture.

It is therefore a principal object of my invention to provide a conveyor structure of the type utilizing a rotatable drive shaft in which no lubrication is required.

It is another object of my invention to provide a conveyor structure that is long wearing and clean, and therefore requires little or no service or maintenance.

It is a further object of my invention to provide a conveyor structure in which a replaceable liner or insert receives substantially all the wear, thereby eliminating frequent replacement of the rail or drive shaft for reasons of excessive wear.

It is a still further object of my invention to provide a conveyor structure that is less expensive to maintain than those requiring lubrication and one that is relatively simple and inexpensive to manufacture.

It is a still further object of my invention to provide a simple and inexpensive means of retaining the insert in a fixed position in the conveyor rail housing.

It is a still further object of my invention to provide a simple and efficient method of manufacturing the conveyor rail housing.

These and other objects of my invention will become apparent from consideration of the following description taken in connection with the accompanying drawing in which.

Figure 1:
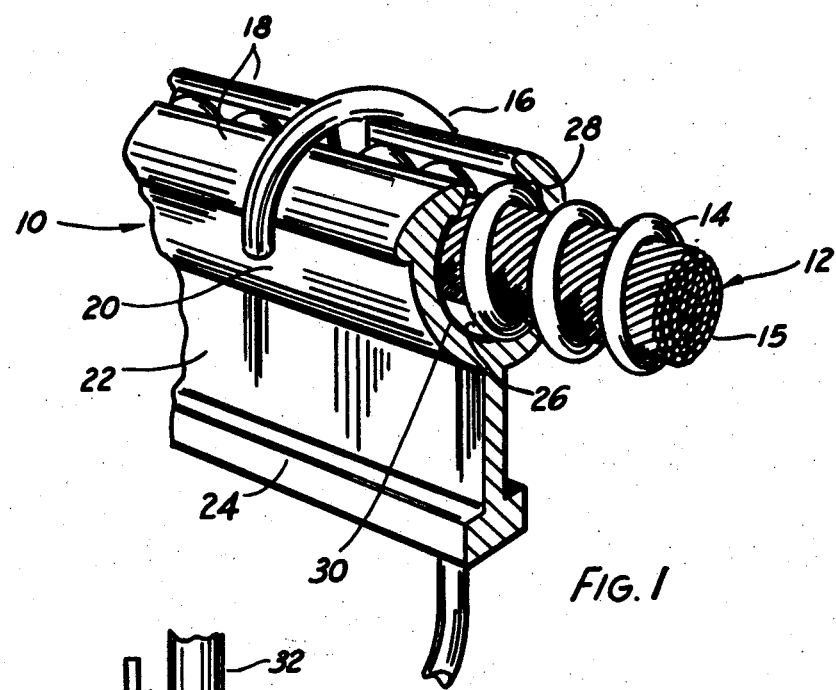
FIGURE 1 is a perspective view of a short section of the conveyor rail housing and drive shaft and showing a load-carrying hook in place thereon.

Referring now to FIGURE 1, the main components of the conveyor are a rail housing, indicated generally by the reference numeral 10, and a laterally-flexible, torsionally-rigid drive shaft 12 that is rotatably driven by a power source such as an electric motor (not shown). The construction of the drive shaft 12 is described in detail and claimed in my copending application Serial No. 518,807, referred to previously. For completeness of the present description the drive shaft 12 has been shown in FIGURE 1 and has an outer helical winding 14 formed on a core 15. The winding 14 is adapted to engage a load carrying hook 16 as it hangs on the upper surfaces 18 of the rail housing 10, the weight of the load being supported by the hook 16 and carried solely by the rail housing 10. Thus, the shaft 12 is able to turn more easily and freely.

The rail housing 10 consists of a tubular member 20 open at the top and supported by a stiffening web 22 that makes the housing 10 substantially rigid vertically but permits it to be bent for horizontal curves. A flange 24 on the bottom of the stiffening web 22 adds some rigidity to the housing 10 in the horizontal direction and also provides a grip or ledge for the supporting brackets (not shown) from which the conveyor is suspended. The tubular member 20 is of a C-shaped cross section and partially encloses an elongated recess 26. Inside the recess 26 near the opening at the top of the tubular member 20 there are formed two shoulders or ledges 28, one on each side of the opening along the entire length of the rail housing 10. Fitted inside the recess 26 is an insert or liner 30 that may be formed of any suitable wear-resistant, low-friction material. For this purpose we have found the synthetic material, nylon, to be satisfactory. As shown, the drive shaft 12 is seated in the recess 26 of housing 10 and the liner 30 is inserted so as to be between the drive shaft 12 and the housing 10. The liner 30 is preferably formed in ten foot sections and should be of the proper width to fit the contour of the entire inner surface of the recess 26 from one ledge 28 to the other ledge 28. The liner 30 is prevented from rotating with the drive shaft 12 by the ledges 28.

The use of the liner 30 eliminates the need of any lubrication in the form of a liquid, semi-liquid or powdered lubricant and therefore the conveyor structure is much cleaner and practically maintenance free. The two main conveyor components, the rail housing 10 and the drive shaft 12, will show little or no wear since the liner 30 will sustain the wear, and when it becomes excessively worn the liner 30 can be easily replaced. The complete elimination of lubrication with its accompanying maintenance makes use of the liner 30 less expensive over a period of time although the initial cost of the entire conveyor may be slightly greater.

The method of retaining the liner 30 in the housing 10 and the method of assembly of the two components presented a particular problem because of the way in which the rail housing 10 is made. The rail housing 10 is preferably made by an extrusion process since this is the simplest and least expensive of known methods of manufacture. Thus, the method of assembling and retaining the liner 30 in the housing 10 should be made compatible with the extrusion process. Note that the ledges 28 are easily and inexpensively formed in the housing 10 by extrusion, that they are a positive method of retaining the liner 30, and that they do not contact the rotating shaft 12. Other methods, such as cementing or riveting, do not have all of these advantages.

A further advantage of my method of retaining the liner 30 in the housing 10 is that it lends itself to fast and relatively simple and inexpensive methods of assembly of the conveyor. Also, with certain preferred methods of assembly it is possible to use flat strips of material for the liner 30 rather than the more expensive preformed sections that would be necessary for other methods of retention.

Figure 2:
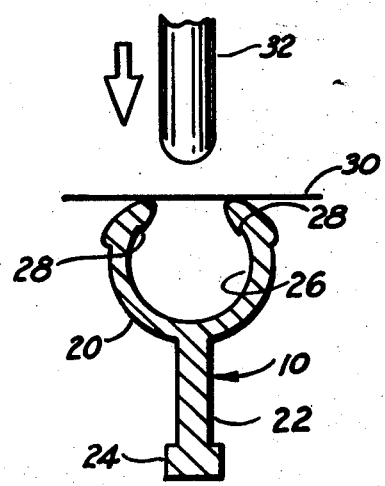
FIGURE 2 is a sectional view of the conveyor rail housing and liner prior to assembly.
Figure 3:
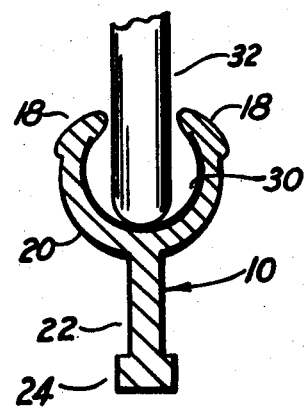
FIGURE 3 is a sectional view similar to FIGURE 2 but showing the liner in position in the rail housing.

Such a preferred method of assembly using flat strips is illustrated in FIGURES 2 and 3. The flat strip of material of proper dimensions for liner 30 is positioned over the top of the rail housing 10. A suitable tool, indicated by numeral 32, is then used to press the liner 30 into the recess 26, the resilience of the liner 30 being sufficient to snap it into place with its edges engaged under the ledges 28. Once the liner 30 is thus in place, and once the drive shaft 12 is seated inside the recess 26, it is practically impossible for the liner 30 to move out of position.

Having thus described my invention, it will be apparent to those skilled in the art that various modifications may be made by those skilled in the art without departing from the spirit or scope of the invention. It is my intention that the above description of the invention is in illustration and not in limitation thereof, and the scope of the invention should be determined solely by the following claims.

I claim:

1. In a conveyor structure of the class described, a rail housing having a C-shaped tubular member open at the top along the entire length thereof to provide an elongated recess having a smooth curved surface, two ledges formed in said recess, one on each side of the opening near the top of said member along the entire length thereof, a replaceable liner fitted in said recess, said liner being constructed of a relatively thin, wear-resistant, low-friction material of substantially uniform thickness to provide a smooth curved wearing surface, and a drive shaft seated in said liner and rotatable relative to said housing, said liner being maintained in a fixed position relative to said housing by engagement with said ledges.

2. The conveyor structure of claim 1 in which said liner is nylon.

References Cited in the file of this patent

UNITED STATES PATENTS

| | | |
|---|---|---|
| 1,730,799 | Bowes | Oct. 8, 1929 |
| 1,792,733 | De Wein | Feb. 17, 1931 |
| 2,496,764 | Whitney | Feb. 7, 1950 |
| 2,620,917 | Dahlberg | Dec. 7, 1952 |
| 2,747,725 | Hatch | May 29, 1956 |
| 2,908,379 | Hamilton | Oct. 13, 1959 |
| 2,924,008 | Haushalter | Feb. 9, 1960 |
| 3,032,377 | Blase | May 1, 1962 |